United States Patent [19]

Statz et al.

[11] Patent Number: 5,298,571

[45] Date of Patent: Mar. 29, 1994

[54] HIGH-RESILIENCE IONOMERIC COMPOSITIONS FOR GOLF BALL COVERS

[75] Inventors: Robert J. Statz, Kennett Square, Pa.; John F. Hagman, Wilmington, Del.

[73] Assignee: E. I. Du Pont de Nemours and Company, Wilmington, Del.

[21] Appl. No.: 84,340

[22] Filed: Jun. 30, 1993

Related U.S. Application Data

[63] Continuation of Ser. No. 829,844, Jan. 31, 1992, abandoned.

[51] Int. Cl.$^5$ .................. C08L 33/02; A63B 37/12
[52] U.S. Cl. .................. 525/330.2; 260/998.14; 273/235 R; 273/DIG. 22; 524/908; 525/196; 525/221; 525/330.1; 525/366; 525/370
[58] Field of Search .................. 525/330.1, 330.2; 260/998.14; 273/235 R, DIG. 22

[56] References Cited

U.S. PATENT DOCUMENTS

| | | | |
|---|---|---|---|
| 3,819,768 | 6/1974 | Molitor | 273/235 R |
| 4,264,075 | 4/1981 | Miller | 273/235 R |
| 4,526,375 | 7/1985 | Nakade | 273/235 R |
| 4,911,451 | 3/1990 | Sullivan | 273/235 R |
| 5,000,459 | 3/1991 | Isaac | 273/235 R |
| 5,068,151 | 11/1991 | Nakamura | 428/407 |
| 5,197,740 | 3/1993 | Pocklington | 273/235 R |

FOREIGN PATENT DOCUMENTS

| | | | |
|---|---|---|---|
| 0443706 | 8/1991 | European Pat. Off. | A63B 37/12 |
| 0470854 | 2/1992 | European Pat. Off. | A63B 37/00 |
| 61-82768 | 4/1986 | Japan . | |
| 63-229077 | 9/1988 | Japan . | |
| 9202279 | 2/1992 | PCT Int'l Appl. | A63B 37/12 |

OTHER PUBLICATIONS

Research Disclosure Journal Article #27103; Published by Kenneth Mason Pub. Ltd. Nov. '86.
Research Disclosure Journal Article #29703; Jan. '89.

Primary Examiner—Joseph L. Schofer
Assistant Examiner—Fred Zitomer
Attorney, Agent, or Firm—Peter A. Fowell; Craig H. Evans

[57] ABSTRACT

Ionomers derived from ethylene/methacrylic acid or ethylene/acrylic acid copolymers, containing high levels of acid neutralized with lithium, zinc and sodium are blended in defined amounts to form compositions with very high resilience. The compositions are highly suitable for use as golf ball covers.

10 Claims, 3 Drawing Sheets

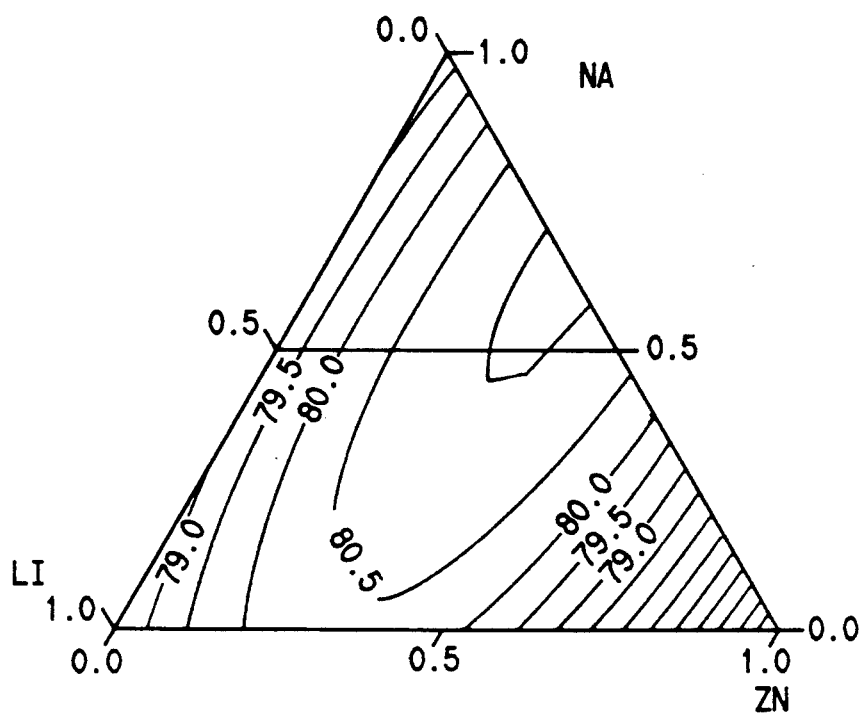
FIG.5 REBOUND
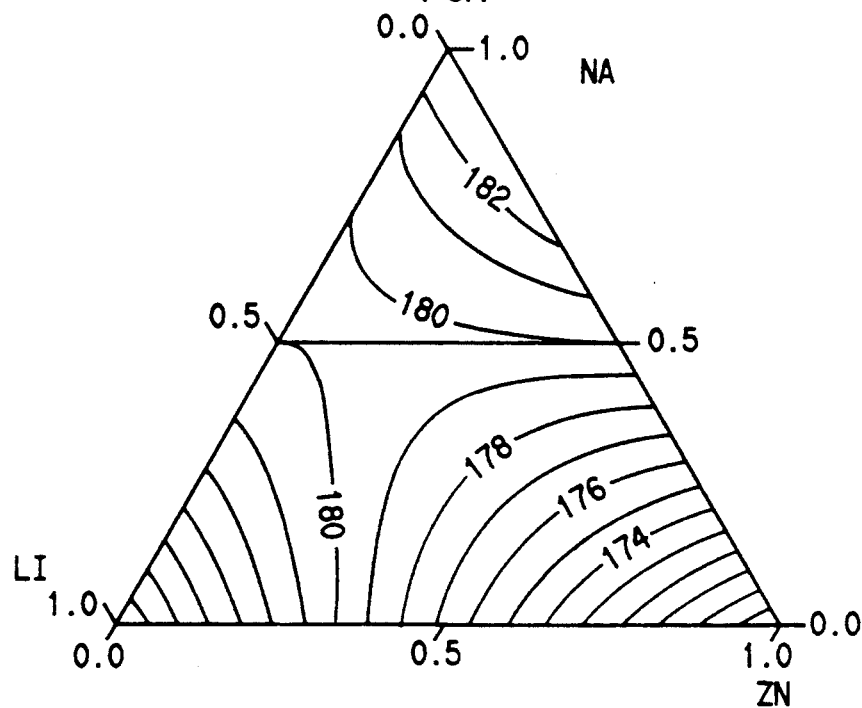
FIG.6 PGA

HIGH-RESILIENCE IONOMERIC COMPOSITIONS FOR GOLF BALL COVERS

This is a continuation of application Ser. No. 07/829,844 filed Jan. 31, 1992, now abandoned.

BACKGROUND OF THE INVENTION

1. Field of the Invention

This invention relates to ionomeric compositions which have high resilience, and more specifically it relates to such compositions formed from ethylene/methacrylic acid or acrylic acid based copolymers with high levels of acid, neutralized with lithium, zinc and optionally sodium ions. The compositions are particularly useful as golf ball covers.

2. Description of Related Art

Golf ball covers made from ionomers based on ethylene/methacrylic acid or acrylic acid are known in the prior art and have long been used commercially.

Many properties are essential in a cover material. Covers must be adequately tough over a range of temperatures and must be durable. Beyond these essentials however, certain other characteristics of the cover material are desirable. While both the center and windings of a three-piece ball and the core of a two-piece ball are major determinants of the playing characteristics of a golf ball, the cover too plays a significant role. A key property which has long been recognized as a guide to obtaining better cover materials is the resilience of the material. This is often assessed by measurement of the coefficient of restitution (COR).

There is an ever continuing search for materials with the highest possible COR, combined with adequate toughness and durability, for use as covers for golf balls. This search however has revealed divergent, even contradictory trends, or mere broad generalities with regard to which acid, at what level, whether a single metal ionomer or a blend of two three or more metal ionomers should be blended, and how much of each are best, as can be seen from the following references.

U.S. Pat. No. 3,819,768 (Molitor), discloses that when golf balls with the same core are covered with a blend of sodium and zinc ionomer, sodium ionomer alone or zinc ionomer alone, the blend gives a ball with a higher COR than either alone. In other words a synergistic effect is taught when using zinc and sodium together.

Research Disclosure Journal Article #27103, published by Kenneth Mason Publications Ltd., November 1986, and disclosed by E.I. du Pont de Nemours & Company, discloses that lithium ionomers can be used to produce golf ball shells (covers) which can be used to produce golf balls with superior properties, including coefficient of restitution, to shells made of sodium or zinc ionomers. It is also disclosed that lithium ionomers can be used in blends with other ionomers where they can impart better cut resistance to these other materials.

U.S. Pat. No. 5,000,459 (Isaac), in its disclosure interprets the above du Pont disclosure to mean that while lithium ionomers can be used to upgrade the properties of other ionomer resins, the lithium ionomers resins exhibit the best properties if they are used alone. The patent goes on to disclose that blends of lithium and sodium ionomers when used as covers for golf balls produce balls with substantially similar properties to those using lithium ionomer alone. Thus, while no synergism is disclosed on blending, (as is the case with sodium/zinc ionomer blends discussed above), the lithium ionomer can be diluted with sodium ionomer with no deleterious effect. The incentive for doing this is that lithium ionomers are substantially more expensive than sodium ionomers.

Another Research Disclosure Journal Article #29703, published in January 1989, and disclosed by E.I. du Pont de Nemours & Company, discloses that ionomers produced from polymers of ethylene/acrylic or methacrylic acid containing greater that 15 wt. % acid are stiffer and harder than ionomers with less acid. These materials are useful for improving articles where these properties are an advantage, such as golf balls.

Japanese published application No. J63-229077A, published Sep. 22, 1988 discloses blends of ionomers of two different metals or a single ionomer neutralized with two different metal ions. The first metal ion may be an alkali metal ion which is any of lithium, sodium, potassium or cesium and the second metal ion may be zinc or magnesium. In addition, if a single ionomer is used it must be based on ethylene/acrylic acid, (not methacrylic acid) while if a blend of two ionomers is used, the alkali metal ionomer must also be based on an acrylic acid copolymer.

U.S. Pat. No. 4,911,451 (Sullivan et al.), discloses that improved resilience is obtained in a golf ball cover using a blend of a sodium ionomer based on an ethylene copolymer with about 11 wt. % acrylic acid, and a zinc ionomer based on an ethylene copolymer with 11–16 wt. % acrylic acid. In the examples, the average level of acid is well below 16 wt. %. The acid must be acrylic acid, methacrylic acid derived ionomers showing poorer properties. Lithium, magnesium and other metal ions are described as being within the scope of the invention.

Japanese published application No. J61-82768 discloses golf balls with high resilience using a cover material which is a mixture of sodium ionomer or sodium and zinc ionomer with lithium, potassium, cesium or rubidium ionomers.

U.S. Pat. No. 5,068,151 discloses a cover with improved resilience which contains as the major constituent, a lithium ionomer based on an ethylene/alpha,beta-unsaturated carboxylic acid copolymer with 10–20 wt. % acid. Higher than 20 wt. % acid is disclosed as producing a brittle resin. In addition to lithium ionomer, the cover may also contain an ionomer of a bivalent or trivalent metal such as magnesium, calcium, zinc, aluminum, barium and copper, with magnesium and zinc being preferred. Sodium ionomer is not mentioned.

U.S. Pat. No. 4,526,375 (Nakade), discloses that covers of a mixed ionomer of sodium and zinc, sodium and magnesium or preferably sodium, zinc and magnesium have superior low temperature toughness.

Golf balls having a cover which are a blend of lithium and zinc ionomers based on ethylene-acid copolymers containing up to 15% methacrylic acid are also known.

There remains a need for a golf ball cover material having superior resilience, as measured by coefficient of restitution.

SUMMARY OF THE INVENTION

The essence of the invention involves the recognition that very high resilience is obtained only using a blend which contains lithium and zinc ionomers which are made from high acid ethylene/acid copolymers. Sodium ionomer can be present to provide an additional balance of other properties such as percent rebound, without any major effect on resilience.

Accordingly there is provided a composition comprising a neutralized ethylene-acid copolymer, a neutralized blend of ethylene-acid copolymers or a blend of neutralized ethylene-acid copolymers wherein the acid is methacrylic acid or acrylic acid and wherein the average weight percent acid in the composition before neutralization is from 16 to 25% and wherein at least 30% of the acid groups in the composition are neutralized with metal ions comprising (A) 20–90% equivalents of lithium ions,
(B) 5–50% equivalents of zinc ions and
(C) 0–55% equivalents of sodium ions, based on the total number of equivalents of ions present, with the proviso that the coefficient of restitution is greater than 0.700.

Further provided are golf ball covers made from the above blends.

BRIEF DESCRIPTION OF THE FIGURES

FIG. 5 shows the percent Rebound for a blend of three ionomers only-again, sodium, zinc and lithium, each varying in weight fraction from 0 to 1.

FIG. 6 shows the PGA compression for a blend of the same three ionomers only.

DETAILED DESCRIPTION OF THE INVENTION

Figure 1:
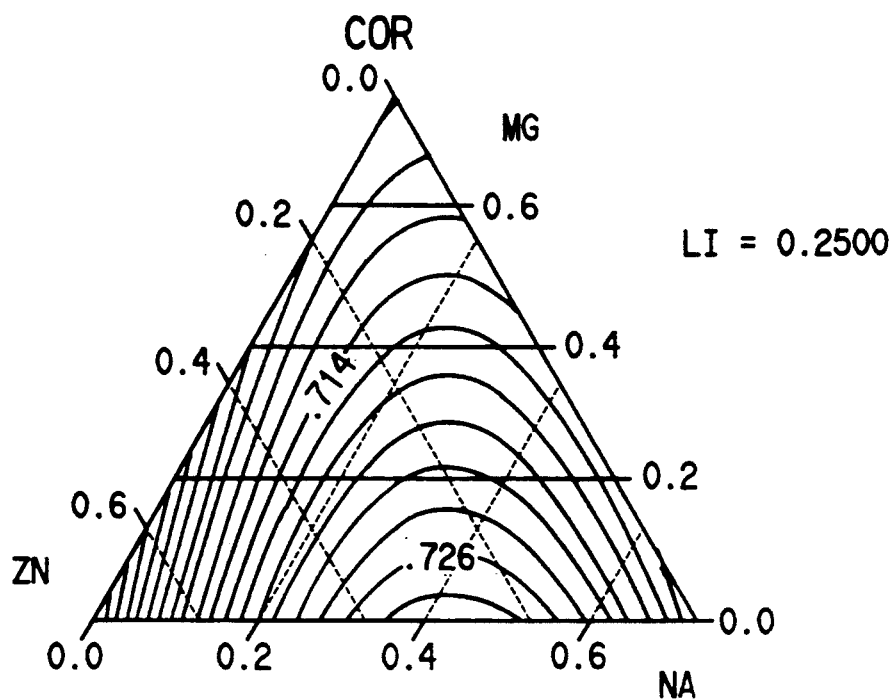
FIG. 1 is a ternary diagram or plot showing the COR of blends of four ionomers; lithium, sodium, zinc and magnesium. The lithium content is constant at a weight fraction of 0.25. The diagram shows the variation in COR as each of the other three ionomers (magnesium, sodium and zinc) varies in weight fraction from 0 to 0.75.

In the following disclosure the term 'direct copolymer' means a copolymer made by polymerization of monomers together, at the same time, as distinct from a graft copolymer where a monomer is polymerized on an existing polymer chain.

The compositions of this invention are blends of ionomers derived from direct copolymers of ethylene and methacrylic acid or acrylic acid (or both) by neutralization with metal ions. Methods of preparing such ionomers are well known and are described in U.S. Pat. No. 3,264,272 which is herein incorporated by reference. Preparation of these direct acid copolymers on which the ionomers are based is described in U.S. Pat. No. 4,351,931 which is also incorporated by reference herein. Acid copolymers with high levels of acid are difficult to prepare in continuous polymerizers because of monomer-polymer phase separation. This difficulty can be avoided however by use of 'cosolvent technology' as described in U.S. Pat. No. 5,028,674 which is also incorporated herein by reference or by employing somewhat higher pressures than those at which copolymers with lower acid can be prepared.

Coefficient of restitution (COR) is a measure of resilience. It is measured by a number of methods which are not always comparable. For example, it is sometimes measured on finished golf balls where the material of special interest is, for example, the cover material of the golf ball. In this case the COR measured is that of the golf ball itself. Alternatively, it may be measured on solid spheres of the material under consideration, in which case the COR is characteristic of the material alone. In either case more than one set of test conditions for its measurement can be used.

In comparing golf ball cover materials, there are two approaches. One approach is to take a specific golf ball core and put on a cover of the material to be tested, then measure a COR for the golf ball. The other is to measure a COR on a sphere of the material itself. This is the method of testing used in this disclosure. The method of measurement is further described below in the section headed 'testing criteria'. Generally, higher CORs measured for the material itself will translate into higher CORs for a golf ball using a cover of the material, for the same core. Materials with a COR of 0.700 and above, as measured by the method defined herein, are of importance in this invention. This level of resilience represents a very high level of resilience for a golf ball cover material. For very superior performance, CORs of above 0.715 are preferred.

There are three key compositional features to the materials of this invention. They are the average acid level of the underlying ethylene-acid copolymers (that is, the ethylene acid copolymers from which the ionomers are derived) in the blend, the average level of neutralization, and the type and relative amounts of metal ions with which the materials are neutralized.

The average weight percent acid of the underlying acid copolymers should be between 16 and 25. It will be recognized that a blend with this level of acid can be obtained by blending copolymers, one or both of which has an acid level outside this range. Such blends are within the bounds of this invention provided the COR of the final ionomer blend is greater than 0.700. Preferably the weight percent acid in each acid copolymer from which the ionomer components are derived should be close to the 16 to 25 range, and most preferably they should be within this range.

The average level of neutralization of the acid groups in the underlying ethylene-acid copolymers should be greater than 30 percent. Preferably, the average level of neutralization is from 45 to 70%. Commercially produced ionomers may have their underlying acid groups neutralized to between about 29 and 75 percent. The conventional definition of ionomers, as defined in U.S. Pat. No. 3,264,272 is broader still. In this definition, an ionomer is an acid copolymer whose acid groups are from 10 to 90% neutralized. It will be recognized that an individual ionomer used to make a blend may be less than 30% neutralized, but that on blending with an ionomer of higher level of neutralization, the desired average level of neutralization can be achieved. It would even be possible to incorporate additional unneutralized acid copolymer and be within the bounds of the definition of the invention. In the melt, the ions in an ionomer are believed to be quite labile. As a result, the metal ions become distributed and associated with the acid groups of all the polymer chains present. Thus a polymer chain derived from an ionomer with a low level of neutralization will not remain at that low level of neutralization if the average level of neutralization is higher.

The third compositional requirement concerns the particular metal ions and their relative amounts in the blend. Because the ions are labile in the melt, a composition containing a given relative amount of different metal ions may be obtained in several ways. The simplest way is by blending different metal ionomers each containing sufficient of each of the metal ions to provide the desired ratio of ion types. However, ionomers which contain more than one type of ion or ionomers with low amounts of a given ion together with one with a high amount of that ion, and even un-neutralized acid copolymer can be blended to make a given blend provided the final relative amount of different metal ions is satisfied.

A consequence of the broad definition of ionomers is that it is not particularly convenient or definitive to define the invention, at its broadest, merely in terms of weight percentages of each of a specific metal ionomer. As noted, the essential feature is that the ratio of ions be within certain ranges. Clearly a blend of a given percent of one ionomer and a given percent of another ionomer will not have closely corresponding percentages of ions (or equivalents in the case of multivalent ions) if the levels of neutralization of each ionomer is widely different. A compositional definition based solely on percent of a given ionomer would encompass a very broad range of possible compositions unless the level of neutralization of each ionomer was limited to a narrow range. A more precise way to define such blends is as we have done; in terms of the underlying acid copolymer composition, the ratio and types of ions present, and the average level of neutralization.

Experimentally, blends of single metal ionomers were made. The level of neutralization of each of the ionomers used was similar for each, and was in the range 40 to 57%. It is convenient in documenting these compositions to refer to the percentages of each ionomer. Because the level of neutralization for each ionomer was similar, the ratio of the numbers of equivalents of each ion type corresponds reasonably closely with the weight ratio of ionomers. As an example, a blend of lithium, sodium and zinc ionomers, each made from an ethylene/methacrylic acid copolymer containing 20 wt. % acid and each neutralized to 50% which contained 33.3 wt. % of each ionomer would contain 35%, 33.8% and 31.1% equivalents of the total number of equivalents of lithium ions, zinc ions and sodium ions. As another example, an ionomer blend containing 25 wt. %, 25 wt. % and 50 wt. % ionomers derived from 20 wt. % acid copolymers all neutralized to 30% with lithium, zinc and sodium ions would contain equivalents of those ions of 26.0%, 25.5% and 48.5% respectively. The lower percent of zinc ions relative to percent zinc ionomer is merely a function of its higher equivalent weight.

In the figures, weight percent ionomer (expressed as weight fraction), rather than percent of the different ions, is used for convenience.

Prior art suggests that the highest coefficient of restitution is obtained using high acid copolymer ionomers, and that lithium ionomers are better than sodium or zinc ionomers. In blends of ionomers, while synergism such as that between sodium and zinc is known to exist, and while sodium and lithium blends can be as good as lithium alone, there is no suggestion that the specific combination of zinc and lithium ionomers provides an optimum combination. We have now found this to be the case. Furthermore, while many other metal ionomers have been suggested, in fact the presence of other metal ionomers such as magnesium has a negative effect on coefficient of restitution.

Surprisingly also, sodium and lithium ionomer blends do not give as high COR values as zinc and lithium blends, despite the fact that sodium ionomer alone gives significantly higher COR values than zinc ionomer alone.

Identification of compositions with the very highest COR from the many possible combinations of the many different metal ionomers disclosed in the golf ball related art would be a daunting, virtually impossible task. The best composition might be a single metal ionomer, or a blend containing two, three or even four ionomers (i.e. four metal ions). In the present case an unusual experimental approach was used to determine compositions with the highest COR which could be obtained from among four of the most common, readily available ionomer types; those of lithium, sodium, magnesium and zinc. This represents a variety of metal types, covering three groups of the periodic table. Certain two or three component blends of the four ionomers were selected for testing, using an 'experimental design' program known as ECHIP, which is a copyrighted product of Echip Inc. The program uses data from a minimum number of compositions to derive a map of a given property for all possible compositions. The data which are shown in Table 1 are used to generate the triangular composition plots shown in FIGS. 1, 2, 3, 4, 5 and 6.

Figure 2:
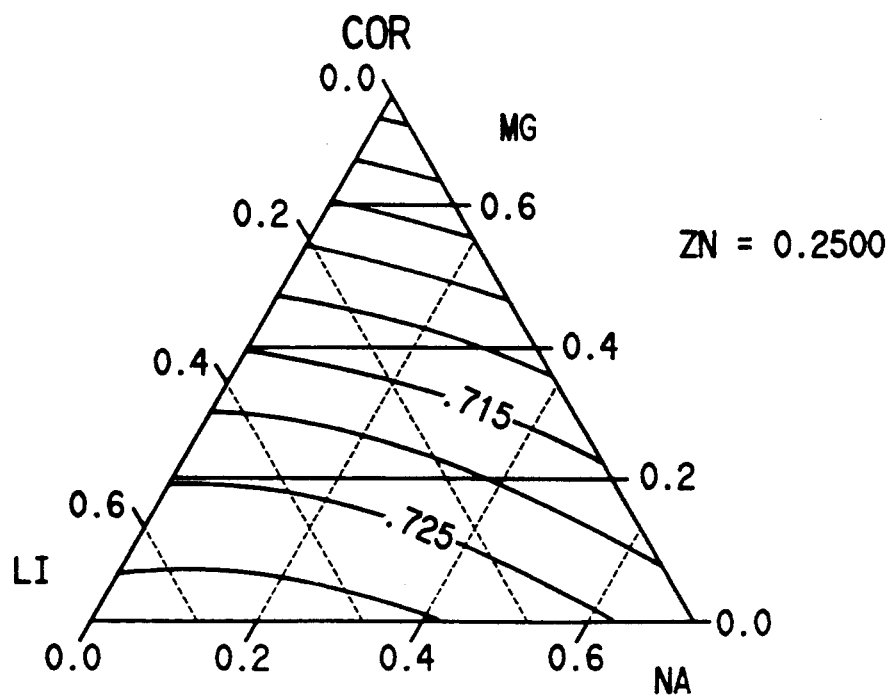
FIG. 2 is a similar ternary plot of COR of blends of the same four ionomers. In this case, the zinc ionomer content is constant at a weight fraction of 0.25, and the plot shows variation in COR as each of the other three ionomers (magnesium, lithium and sodium) varies from a weight fraction of 0 to 0.75.
Figure 3:
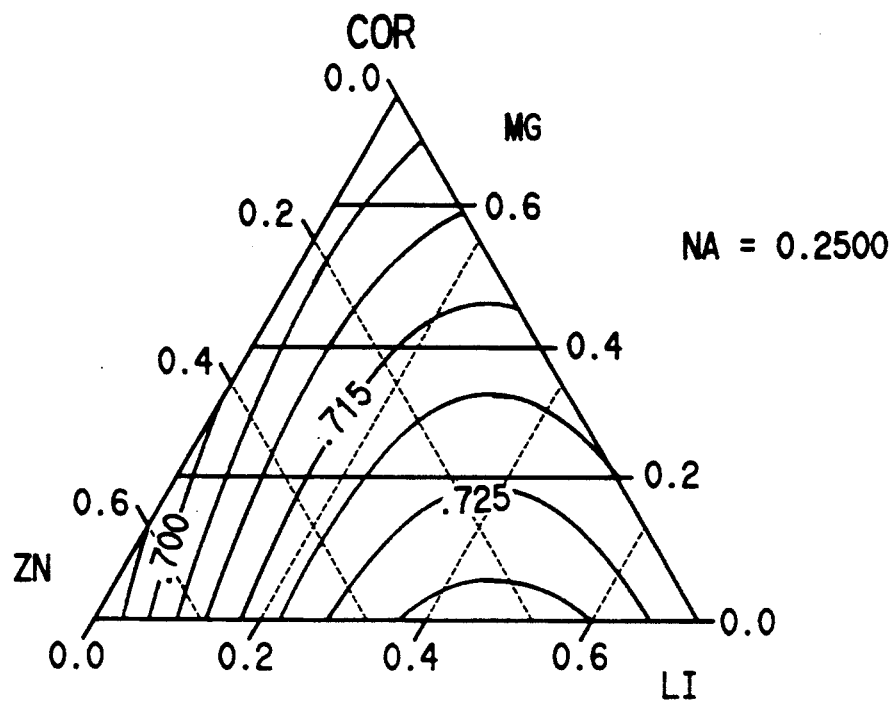
FIG. 3 is similar again, in this case sodium being held constant at 0.25 wt. %, the plot showing variation in COR for the remaining three ionomers (magnesium, zinc and lithium).

FIGS. 1 to 3 show COR values for blends of the four ionomers. These figures are plots of the COR where the varying ionomer content of three of the ionomers forms the basis of the plot, while the fourth ionomer present is constant at a weight fraction of 0.25 of the total blend. One of the axes always represents magnesium. The other two are different combinations of the remaining three ionomers (zinc and sodium for FIG. 1, lithium and sodium for FIG. 2 and zinc and lithium for FIG. 3). The axes represent the possible weight fractions of each of three ionomers depicted in the figure, i.e. from 0 to 0.75. It can be seen that the highest COR is with zero percent magnesium in each case (the base line on each of the triangular plots). Magnesium thus has an adverse effect on COR when added to any combination of lithium, zinc and sodium. Therefore it is best to have a combination of only lithium, zinc and sodium, and not have a four ionomer combination, at least when that fourth ionomer is magnesium. This does not mean, of course, that an ionomer of a metal other than these four could not form part of a useful two, three or four component blend. But it provides an optimum combination of four of the most readily available ionomers. It will be appreciated that the same approach could be applied to include less common ionomers.

Figure 4:
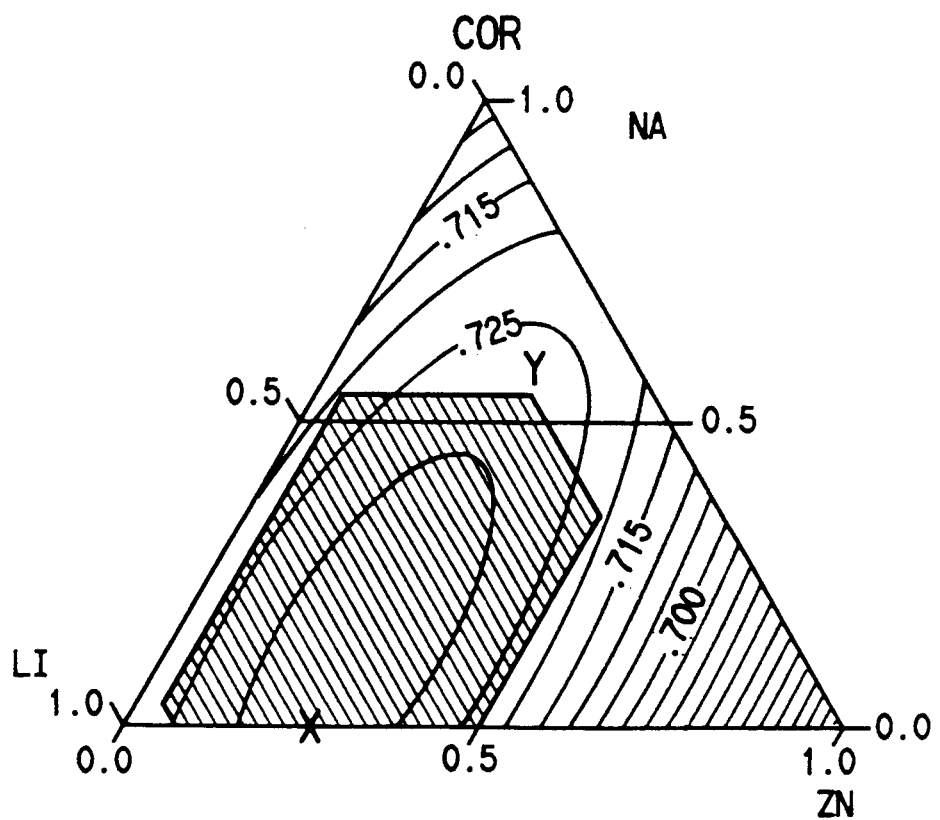
FIG. 4 shows the COR for a blend of three ionomers only, sodium, zinc and lithium, each varying in weight fraction from 0 to 1.

FIG. 4 is for a three component blends of zinc, sodium and lithium ionomers only. In this plot, the contours show that there is a focal point of maximum COR. This blend contains about 75 wt. % lithium and 25 wt. % zinc ionomers. The COR value at this point is about 0.731. This composition is designated as point X. Very good values are still obtained within the 0.725 contour when 55 wt. % of the lithium ionomer has been replace by sodium ionomer, i.e. a 20/55/25 Li/Na/Zn ionomer blend, (point Y). The diagonally shaded area represents the ranges of ionomer compositions containing 20-90 wt. % lithium, 5-50 wt. % zinc, and 0-55 wt. % sodium ionomers, and is a squared-off rough approximation to a contour of about 0.723. To achieve the highest COR, combined with good rebound the preferred levels of ionomer are 30-90 wt. % lithium ionomer, 15-40 wt. % zinc ionomer and 0-45 wt. % sodium ionomer, and most preferred levels are 40-80 wt. % lithium, 20-40 wt. % zinc and 0-40 wt. % sodium ionomer. In compositions with the broadest range of ionomer components, especially for lower levels of lithium ionomer and/or higher levels of zinc and sodium ionomers, it is preferred that the average level of acid in the underlying acid copolymer be higher, preferably above about 18 wt. % acid.

A similar series of plots could be generated for each of various average acid levels for the un-neutralized copolymers from which the ionomers are derived (16 to 25%) and each average percent neutralization (30 to 90%, the value of 90% being the maximum level of neutralization for an ionomer as defined in U.S. Pat. No. 3,264,272). For lower acid levels the COR contours would be lower and for higher acid levels they would be higher in value. For 16 wt. % acid compositions the point X would be expected to have a value of about 0.71 and all the contours would be correspondingly lower. For 25 wt. % acid point X would be expected to have a value of about 0.75. At 20 wt. % acid and 75 percent neutralization the point X would be expected to have a value of about 0.74 to 0.76.

The melt index of the blend ionomer and of the component ethylene-acid copolymers from which the ionomer blend is derived will have some effect on the COR. The essential nature of the plot however will not be changed, only the values of the contours. The melt index of the ionomer blend of this invention is preferably below 10 and most preferably below 6.

FIG. 5 shows a triangular plot of percent rebound for the same three ionomers. FIG. 6 shows a further triangular plot for PGA compression for the same three ionomers. FIG. 5 shows that high levels of zinc give lower levels of rebound. FIG. 6 shows that high levels of sodium give higher PGA compression. Generally, higher rebound and lower PGA compression is desirable. As can be seen, the composition limits of this invention satisfy both of these demands.

Low levels of other ionomers which do not significantly affect the essential nature of the two or three component blends of this invention, and do not reduce the COR below 0.700 are allowable.

While prior art suggests some ethylene/acrylic acid ionomers have a higher COR than those based on ethylene/methacrylic acid, at high acid levels particularly with lithium ionomers, stiffness increases. This can result in a gradual drop in toughness and durability. Ethylene/acrylic acid based ionomers are believed to be more brittle than ethylene/methacrylic acid based ionomers for a given acid level. Overall, at the high acid levels in compositions of this invention, each acid may have its advantages for particular types of balls. Thus neither acid is especially preferred.

The cover materials for golf balls of the present invention may also include materials which do not detract from the inherently novel characteristics thereof. Such materials include such art-recognized ingredients as pigments, optical brighteners, stabilizers, antioxidants etc. Effective amounts are usually added to achieve the desired properties. For example, up to 3 wt. % of white pigment may be added to achieve a desirable whiteness.

The blend of ionomers or acid copolymers and any additives may be made by conventional extrusion blending. Melt temperatures of from 175° to 220° C. are suitable. High levels of shear are not necessary.

Spheres for testing of about 1.515 inches in diameter were prepared by injection molding. Melt temperatures of 175° to 220° C. are suitable. No special conditions are necessary, and standard adjustments can be made to suit the particular composition.

Golf ball covers of these materials may be made by conventional processes for such covers. Typical methods are described in U.S. Pat. No. 5,000,459 which is herein incorporated by reference.

TESTING CRITERIA

In the examples set out below, a number of tests are used in the evaluation of the ionomer blends of this invention: coefficient of restitution or COR, percent rebound and PGA compression. The COR is measured by firing a sphere of the ionomer, from an air cannon at an initial velocity of 180 ft./sec as measured using a speed monitoring device over a distance of 3 to 6 feet from the cannon. The ball strikes a steel plate positioned nine feet away from the cannon and rebounds through the speed-monitoring device. The return velocity divided by the initial velocity is the COR.

PGA compression is defined as the resistance to deformation of a golf ball, measured using a standard industry ATTI machine.

Percent rebound is determined by dropping the sphere from a height of 100 inches and measuring the rebound from a hard, rigid surface such as a thick steel plate or a stone block.

Melt Index is determined using ASTM D-1238 condition E, at 190° C., using a 2160 gram weight.

EXAMPLES AND COMPARATIVE EXAMPLES

Various blends as defined in Table 1, of lithium, zinc, magnesium and sodium ionomers based on ethylene/methacrylic acid copolymers containing 20 wt. % acid were made by extrusion blending. The blends were molded into spheres and properties measured according to the test criteria described. The property data obtained, which is also given in Table 1 was used to derive the plots shown in FIG. 1 through 6.

Some data for ionomers containing only 15 wt. % acid, that is to say, for compositions outside this invention, are shown in Table 2.

Note that for the 20% acid copolymer based ionomers themselves, shown at the bottom of Table 1, the COR of lithium ionomer is higher than that of sodium ionomer which is much higher than that of zinc ionomer. Note however that magnesium ionomer also has a much higher COR than zinc. Exactly the same trend is seen for percent rebound. Yet in blends, zinc is part of the compositions with the highest COR or percent rebound and magnesium is not.

The values in Table 2 show the significantly lower COR values for ionomers derived from 15 wt. % acid copolymers and for one ionomer blend. The trend for COR and percent rebound however is similar to that for the 20 wt. % acid compositions.

TABLE 1

| PROPERTIES OF IONOMER BLENDS | | | | | | |
|---|---|---|---|---|---|---|
| Blend # | 1 | 2 | 3 | 4 | 5 | 6 |
| Wt % Li Ionomer | 0 | 0 | 50 | 0 | 50 | 50 |

TABLE 1-continued
PROPERTIES OF IONOMER BLENDS

| Wt % Na Ionomer | 50 | 50 | 50 | 0 | 0 | 0 |
|---|---|---|---|---|---|---|
| Wt % Zn Ionomer | 50 | 0 | 0 | 50 | 50 | 0 |
| Wt % Mg Ionomer | 0 | 50 | 0 | 50 | 0 | 50 |
| COR | .718 | .706 | .718 | .676 | .723 | .717 |
| % Rebound | 81.1 | 78.6 | 79.1 | 77.4 | 80.3 | 78.7 |
| PGA Compr. | 178 | 179 | 180 | 173 | 177 | 179 |
| Hardness, D | 76 | 73 | 76 | 73 | 77 | 75 |

| Blend # | 7 | 8 | 9 | 10 |
|---|---|---|---|---|
| Wt % Li Ionomer | 0 | 33 | 33 | 34 |
| Wt % Na Ionomer | 34 | 34 | 34 | 0 |
| Wt % Ionomer | 33 | 33 | 0 | 33 |
| Wt % Mg Ionomer | 33 | 0 | 33 | 33 |
| COR | .712 | .721 | .718 | .713 |
| % Rebound | 78.9 | 80.3 | 79.3 | 79.1 |
| PGA Compr. | 178 | 179 | 178 | 175 |
| Hardness, D | 76 | 76 | 74 | 74 |
| Ionomer alone: | | | | |
| Wt % Li Ionomer | 100 | | | |
| Wt % Na Ionomer | | 100 | | |
| Wt % Zn Ionomer | | | 100 | |
| Wt % Mg Ionomer | | | | 100 |
| COR | .719 | .703 | .638 | .693 |
| % Rebound | 78.5 | 78.8 | 74.5 | 75.1 |
| PGA Compr. | 187 | 183 | 168 | 175 |
| Hardness, D | 73 | 74 | 73 | 72 |

All blends were made from the same four ionomers.
Melt Indices were lithium ionomer 1.0, zinc ionomer 1.0, sodium ionomer 1.0 and magnesium ionomer 1.5.
The direct ethylene/methacrylic acid copolymer from which all the ionomers were made had 20 wt. % methacrylic acid and a melt index of 65.
Hardness was measured using ASTM D-2240

TABLE 2
PROPERTIES OF LOW-ACID IONOMERS

| Ionomer | | | | |
|---|---|---|---|---|
| Wt % Li Ionomer | 100 | | | |
| Wt % Na Ionomer | | 100 | | 66 |
| Wt % ZN Ionomer | | | 100 | 33 |
| COR | .691 | .668 | .638 | .686 |
| % Rebound | 73.0 | 73.4 | 67 | 74 |
| PGA Compr. | 168 | 170 | 153 | 165 |
| Hardness, D | 70 | 69 | 70 | 71 |

Ionomers made from ethylene/methacrylic acid 85/15 by weight
Lithium ionomer MI = 1.8, Sodium ionomer MI = 2.8
Zinc ionomer MI = 0.9

I claim:

1. A composition comprising a neutralized ethylene-acid copolymer, a neutralized blend of ethylene-acid copolymers or a blend of neutralized ethylene-acid copolymers wherein the acid is methacrylic acid or acrylic acid and wherein the average weight percent acid in the composition before neutralization is from 16 to 25%, and wherein at least 30% of the acid groups in the composition are neutralized with metal ions, comprising
   (A) 20-90% equivalents of lithium ions
   (B) 5-40% equivalents of zinc ions and
   (C) 0-55% equivalents of sodium ions based on the total number of equivalents of metal ions present, with the proviso that the coefficient of restitution is greater than 0.700.

2. The composition of claim 1 comprising a blend of ionomers comprising
   (A) 20-90 wt. % lithium ionomer
   (B) 5-50 wt. % zinc ionomer and
   (C) 0-55 wt. % sodium ionomer.

3. The composition of claim 2 comprising a blend of ionomers comprising
   (A) 30-90 wt. % lithium ionomer
   (B) 15-40 wt. % zinc ionomer and
   (C) 0-45 wt. % sodium ionomer.

4. The composition of claim 2 comprising a blend of ionomers comprising
   (A) 40-80 wt. % lithium ionomer
   (B) 20-40 wt. % zinc ionomer and
   (C) 0-40 wt. % sodium ionomer 5. The composition of claim 2 wherein the average weight percent acid in the composition before neutralization is greater than 18%.

6. The composition of claim 3 wherein the melt index of the blend is less than 10.

7. The composition of claim 1 wherein the coefficient of restitution is greater than 0.715.

8. The composition of claim 2 wherein 45-70% of the acid groups are neutralized.

9. A golf ball cover comprising the composition of claim 1 or 2.

10. A golf ball comprising a core and a cover wherein the cover material comprises the composition of claim 1 or 2.

* * * * *

Adverse Decisions In Interference

Patent No. 5,298,571, Robert J. Statz, John F. Hagman, HIGH-RESILIENCE IONOMERIC COMPOSITIONS FOR GOLF BALL COVERS, Interference No. 103,491, final judgment adverse to the patentees rendered June 30, 1999, as to claims 1-10.
*(Official Gazette February 15, 2000)*